Nov. 13, 1928.
T. P. SMITH
1,691,214
LUBRICATION SYSTEM
Filed March 29, 1924
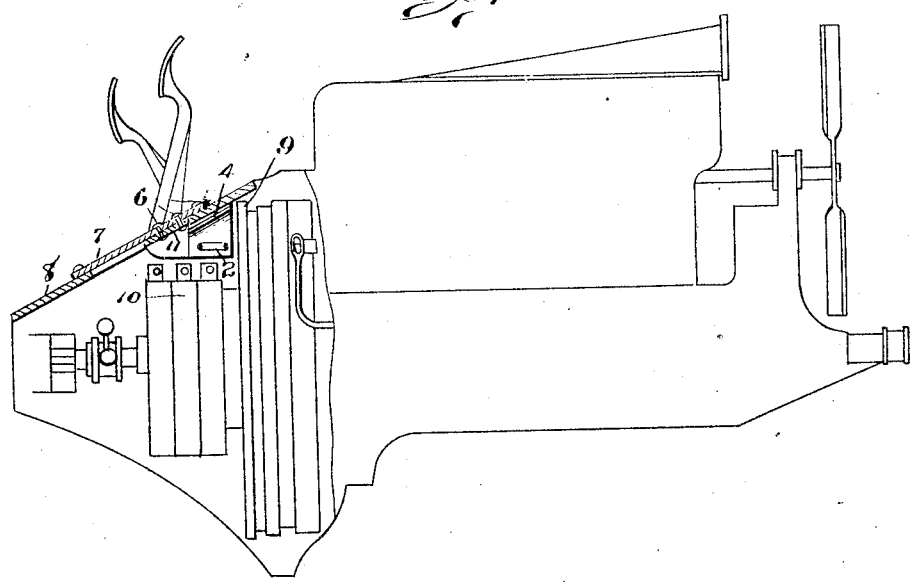
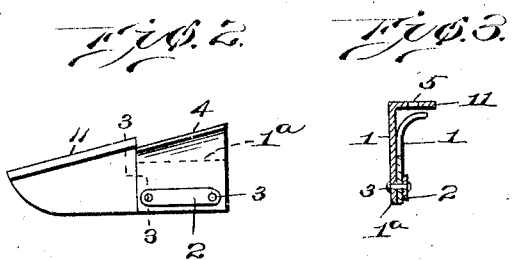
Inventor
Talcott P. Smith
By Robert H. Young, Attorney Patented Nov. 13, 1928.

1,691,214

UNITED STATES PATENT OFFICE.

TALCOTT P. SMITH, OF WASHINGTON, DISTRICT OF COLUMBIA.

LUBRICATION SYSTEM.

Application filed March 29, 1924. Serial No. 702,984.

This invention relates in general to lubrication systems, and more especially to an oiling system for internal combustion engines of the Ford type, the oiling system being designed particularly to lubricate the transmission of such an engine.

This invention is an improvement over the somewhat similar device disclosed in my copending application, Serial No. 670,492 filed October 24, 1923.

I am aware that others have attempted to lubricate the transmission bands of an engine of this type by the use of some sort of an oil deflector adapted to catch the oil being thrown off from the fly wheel by centrifugal force. I am also aware that it is old to position such oil deflectors on the cover of the transmission housing. It was with a view toward improving these structures to the end that a larger percentage of the oil being thrown off the flywheel may be successfully trapped by the deflector, that this invention came into existence.

It is an object of my invention to provide an oil deflector adapted to be secured to the transmission cover and having a portion thereof comprised of some flexible material so fashioned and so positioned that the oil being thrown off from the flywheel of the engine is adapted to force it tightly against the transmission housing, thereby deflecting the oil from the housing downwardly onto the transmission bands.

Other objects of my invention will appear in the accompanying specification and claims and will be disclosed in the drawings in which—

Figure 1 is a side elevation partly in section of my device as installed in an internal combustion engine of the Ford type.

Figure 2 is a side elevation of my device.

Figure 3 is a section of the line 3—3 of Figure 2.

Referring now with greater particularity to the drawings it will be seen that my device is comprised as follows:

The oil deflector 1 has a horizontally flanged portion 11 by which it is adapted to be secured by means of suitable bolts or rivets 6 to the transmission cover plate 7 of the transmission housing 8. The oil deflector has a forwardly extending portion 1ª to which there is adapted to be secured by means of a suitable plate 2 and rivets 3, a flexible deflector member 4 which may be made of leather or any other suitable pliable material. It is to be noted that the flexible deflector member 4 when mounted is curved to face upstream of the particles of oil being thrown off the flywheel 9 by centrifugal force. The deflector 4 is adapted to extend forward to a point in proximity to, and adjacent the upper periphery of, the flywheel 9. It is also positioned closely adjacent the top portion of the transmission casing 8 so that the kinetic energy of the oil particles being thrown off from the flywheel 9 will impinge against the same and cause it to bear tightly against the upper portion of the transmission housing 8 and thereby prevent the oil from forming a film on the housing and passing there around to the sump. Thus the deflecting member 4 acts as a seal between the deflector proper and the housing 8 and insures that a larger portion of the oil being thrown off from the flywheel will reach the transmission bands and lubricate the same.

I claim:

1. In a lubricating system for internal combustion engines of the Ford type, an oil deflector adapted to be secured to said engine and a flexible closure member secured at one end to said deflector and having its other end normally spaced from the transmission housing of said engine but adapted to be forced thereagainst by the oil particles thrown off from the fly wheel of said engine due to centrifugal force.

2. In a lubricating system for internal combustion engines of the Ford type, an oil deflector adapted to be secured to said engine and a flexible closure member secured to said deflector and extending to a point laterally of and near the upper periphery of the flywheel of said engine and adjacent the transmission housing thereof, said closure member being adapted to be actuated to function as such by the flow of oil particles being thrown off from the fly wheel due to centrifugal force.

3. In a lubricating system for internal combustion engines of the Ford type, an oil deflector adapted to be secured to said engine and a flexible closure member secured to said deflector and extending to a point laterally of and near the upper periphery of the flywheel of said engine and adjacent the transmission housing thereof, said closure member having a concave curvature facing upstream of the flow of oil particles being thrown off from the flywheel due to centrifugal force, and adapted to be forced against said housing by the force of said oil particles.

4. In a lubricating system for internal combustion engines of the Ford type, an oil deflector adapted to be secured to the cover of the transmission housing of said engine and to extend to a point laterally of and near the upper periphery of the flywheel of said engine and adjacent the transmission housing thereof, said deflector including a flexible closure member having a concave curvature facing upstream of the flow of oil particles being thrown off the flywheel of said engine, and adapted to be forced against said transmission housing by the kinetic force of said oil particles.

In testimony whereof I affix my signature.

TALCOTT P. SMITH.